United States Patent Office 3,637,738
Patented Jan. 25, 1972

3,637,738
CYCLOALKANO[c]PYRAZOLE ETHERS
Heinz Werner Gschwend, Millburn, and Neville Finch, West Orange, N.J., assignors to Ciba Corporation, Summit, N.J.
No Drawing. Continuation-in-part of application Ser. No. 762,338, Sept. 16, 1968. This application Feb. 12, 1969, Ser. No. 798,801
Int. Cl. C07d 49/18
U.S. Cl. 260—311
7 Claims

ABSTRACT OF THE DISCLOSURE

Basic 3-ethers of cycloalkano[c]pyrazoles, e.g. those of the formula

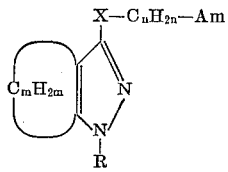

R=aralkyl or aryl
Am=an amino group
X=O or S
$m=3-7$
$n=2-7$ acyl derivatives, quaternaries and salts thereof are antidepressants.

CROSS-REFERENCES TO RELATED APPLICATIONS

This is a continuation-in-part of application Ser. No. 762,338, filed Sept. 16, 1968.

SUMMARY OF THE INVENTION

The present invention concerns and has for its object the provision of new basic 3-ethers of cycloalkano[c] pyrazoles, more particularly those of Formula I

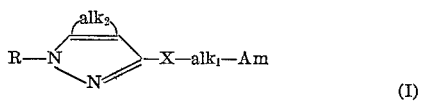

in which R is iso- or heterocyclic lower aralkyl or aryl, Am is an amino group, X is oxygen or sulfur, $alk_1$ is lower alkylene separating X from Am by at least 2 carbon atoms and $alk_2$ is lower alkylene forming a 5 to 7 membered ring, of acyl derivatives, quaternaries and salts thereof, as well as of corresponding pharmaceutical compositions and of methods for the preparation and application of these products. Said compositions are useful imipramine-type antidepressants and antiinflammatory agents.

DESCRIPTION OF THE PREFERRED EMBODIMENTS

The iso-or heterocyclic or aryl radical R is unsubstituted or substituted by one or more than one, preferably by 1 or 2, of the same or of different substituents, for example, by lower alkyl, such as methyl, ethyl, n- or i-propyl or -butyl, free, etherified or esterified hydroxy or mercapto groups, such as lower alkoxy or alkylmercapto, e.g. methoxy, ethoxy, n-or i-propoxy or -butoxy, halogen, e.g. fluoro, chloro or bromo, tri-fluoromethyl, nitro or amino, especially di-lower alkylamino, e.g. dimethylamino or diethylamino. Preferred aralkyl or aryl radicals are monocyclic, e.g. Ar-lower alkyl and Ar, wherein Ar is phenyl, (lower alkyl)-phenyl, (lower alkoxy)-phenyl, (lower alkylmercapto) - phenyl, (halogeno) - phenyl, (trifluoromethyl)-phenyl, (nitro)-phenyl, (di-lower alkylamino)-phenyl, pyridyl or (lower alkyl)-pyridyl. The term "lower" referred to above and hereinafter in connection with organic radicals or compounds respectively, defines such with up to 7, preferably up to 4, carbon atoms.

The amino group Am is a primary, secondary or preferably a tertiary amino group, such as amino, mono- or di-lower alkylamino, e.g. methylamino, ethylamino, n- or i-propylamino or n-butylamino; dimethylamino, N-methyl-N-ethylamino, diethylamino, di-n-propylamino, di-isopropylamino or di-n-butylamino; free etherified or esterified hydroxylower alkylamino, N - (hydroxylower alkyl) - N - lower alkylamino or di - (hydroxylower alkyl) - amino, e.g. 2 - hydroxyethylamino, 3 - hydroxypropylamino, N - (2 - hydroxyethyl) - N - methylamino or di - (2 - hydroxyethyl) - amino; monocyclic 3 to 7 ring-membered cycloalkylamino, cycloalkyl-lower alkylamino, N-cycloalkyl-N-lower alkylamino or N-cycloalkyl-lower alkyl-N-lower alkylamino, e.g. cyclopropylamino, cyclopentylamino, cyclohexylamino, cyclopropylmethylamino, 2 - cyclopentylethylamino, N - cyclopentyl - N-methylamino, N - cyclohexyl - N-methylamino, N-cyclohexyl - N - ethylamino, N - cyclopentylmethyl - N - ethylamino or N - (2 - cyclopentylethyl) - N - methylamino, Ar-lower alkylamino or N-lower alkyl-N-Ar-lower alkylamino, e.g. benzylamino, 1- or 2-phenethylamino, N-methyl - N - benzylamino, N - ethyl - N - benzylamino or N - ethyl - N - (1- or 2-phenethyl)-amino; lower alkyleneimino or free, etherified or esterified hydroxy-alkyleneimino, e.g. ethyleneimino, pyrrolidino, 2-methyl-pyrrolidino, piperidino, 2- or 4-methyl piperidino, 3- or 4-hydroxy-piperidino, 3-hydroxymethyl-piperidino, 4-(2-hydroxyethyl) - piperidino, 1,6- or 2,5 - hexamethyleneimino, 1,7- or 2,6 - heptamethyleneimino, monooxa- or thia-lower alkyleneimino, e.g. morpholino, 3-methylmorpholino or thiamorpholino, mono-aza-lower alkyleneimino, N-lower alkyl-N-Ar-lower alkyl-, N-Ar- or free, etherified or esterified N-(hydroxylower alkyl)-monoaza-lower alkyleneimino, e.g. piperazino, 4-(methyl, ethyl, n-propyl, i-propyl, benzyl, phenyl, 2-hydroxyethyl- or 3-hydroxypropyl)-piperazino, 3-(methyl, ethyl or n-propyl)-3-aza-1,5- or 1,6-hexyleneimino or 4-methyl-4-aza-1,7- or 2,6-heptyleneimino. In the above amino groups two heteroatoms are separated by at least 2 carbon atoms, the etherified hydroxyalkyl groups mentioned are preferably lower alkoxy-alkyl groups, e.g. 2-methoxy- or 2-ethoxy-ethyl, 2- or 3-methoxy-propyl, and said esterified hydroxyalkyl groups are preferably lower alkanoyloxy- or Ar-lower alkanoyloxy-alkyl groups, e.g. 2-(acetoxy, propionyloxy, pivaloyloxy, benzoyloxy or phenylacetoxy)-ethyl or -propyl. The amino group Am may also be linked with the $alk_2$-moiety, so that $alk_2$-Am together represents, for example, aza-cycloalkyl or N-lower alkyl-aza-cycloalkyl, e.g. 2- or 3-pyrrolidyl, 1-methyl-3-pyrrolidyl, 3- or 4-piperidyl or 1-methyl or ethyl-3-piperidyl.

The lower alkylene radical $alk_1$ is preferably 1,3-propylene, 1,4-butylene or 1,5-pentylene, but also 2-methyl-1,3-propylene, 1,3-butylene, 1,3-, 1,4- or 2,4-pentylene, 1,3-, 1,4-, 1,5- or 2,5-hexylene or 2,5-heptylene.

The lower alkylene radical $alk_2$ is preferably 1,2- ethylene, 1,2 or 1,3-propylene, but also 2-methyl-1,3-propylene, 1,2-, 1,3-, 1,4- or 2,3-butylene, 1,5- or 2,4-pentylene, 1,3- or 1,6-hexylene or 3,5-heptylene.

Acyl derivatives of the compounds of Formula I in in which Am is primary or secondary amino, are preferably those derived from lower alkanoic, lower alkenoic, Ar-lower alkanoic or Ar-lower alkenoic, acids, such as the acetyl, propionyl, butyryl or pivalyl; benzoyl, phenylacetyl or cinnamoyl derivatives.

Quaternaries are preferably lower alkyl- or Ar-lower alkylammonium salts, such as halides, sulfates or sulfonates, e.g. methyl- ethyl- or benzylammonium chlorides, bromides, iodides, methyl- or ethylsulfates, methane, ethane or p-toluene sulfonates.

The compounds of the invention exhibit valuable pharmacological properties. Apart from antiinflammatory activity, they exhibit promarily antidepressant effects, as can be demonstrated in animal tests, using advantageously mammals, e.g. mice or rats, as test objects. They can be applied enterally or parenterally, e.g. in the form of aqueous solutions or suspensions, in the dosage range between about 0.1 and 50 mg./kg./day, preferably between about 0.5 and 25 mg./kg./day, advantageously between about 1 and 10 mg./kg./day. The antiinflammatory effects can be determined in the rat paw edema test system [Winter et al., Proc. Soc. Exp. Biol. & Med. III, 544 (1962], wherein the compounds are applied by stomach tube to male and female animals and about 1 hour later an aqueous suspension of carrageenin is injected into the rats' paw and any antiinflammatory activity can be expressed by the reduction of the volume and/or weight of the edematous paw, as compared with the edematous paw volume or weight of untreated or placebo (saline) treated animals. The anti-depressant effects can be evaluated in the amphetamine potentiation test system (P. Carlton, Psychopharmacologia 1961, vol. II, 364), wherein about 8 month old male rats are trained to press a bar every 30 seconds, in order to avoid an electric shock applied through the floor grid. In case the animals receive 0.25 mg./kg./day of amphetamine, their performing rate for avoiding said shocks during a period of about 2½ hours is higher than that of placebo treated animals. In case said animals receive the compounds of the invention intraperitoneally in the above dosages and about 45 minutes later the amphetamine, their rate of avoidance is highest, as compared with that of animals receiving (a) saline alone, (b) saline and amphetamine, or (c) saline and the compounds of the invention. Accordingly, the compounds of this invention are useful antidepressant and antiinflammatory agents, and useful intermediates in the manufacture of other valuable, e.g. pharmacologically active, products.

Particularly useful are compounds of Formula I, in which R is Ar-lower alkyl or Ar, wherein Ar is phenyl, (lower alkyl)-phenyl, (lower alkoxy)-phenyl, (lower alkylmercapto)-phenyl, (halogeno) - phenyl, (trifluoromethyl)-phenyl, (nitro)-phenyl, (di-lower alkylamino)-phenyl, pyridyl or (lower alkyl)-pyridyl, Am is amino, lower alkylamino, di-lower alkylamino, hydroxy-lower alkylamino, N-(hydroxy-lower alkyl)-N-lower alkylamino, di-(hydroxy-lower alkyl)-amino, 3 to 7 ring-membered cycloalkylamino, cycloalkyl-lower alkylamino, N-cycloalkyl-N-lower alkylamino, N-cyclo-alkyl-lower alkyl-N-lower alkylamino, Ar-lower alkylamino, N-lower alkyl-N-Ar-lower alkylamino, lower alkylene-imino, hydroxy-lower alkyleneimino, monooxa-, monothia- or monoaza-lower alkyleneimino, N-lower alkyl-monoaza-lower alkyleneimino, N-Ar-lower alkyl-monoaza-lower alkyleneimino, N-Ar-monoaza-lower alkylene-imino or N-(hydroxy-lower alkyl)-monoaza-lower alkyleneimino, wherein the heteroatoms are separated by at least 2 carbon atoms, X is oxygen or sulfur, $alk_1$ is lower alkylene separating X from Am by at least 2 carbon atoms and $alk_2$ is lower alkylene forming a 5 to 7 membered ring, N-lower alkanoyl, N-lower alkenoyl, N-Ar-lower alkanoyl or N-Ar-lower alkenoyl derivatives, lower alkyl or Ar-lower alkyl quaternaries and acid addition salts thereof.

Preferred are the compounds of Formula II

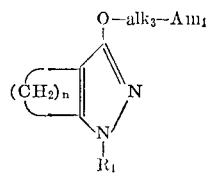

(II)

wherein $R_1$ is phenyl, (lower alkyl)-phenyl, (lower alkoxy)-phenyl, (lower alkylmercapto)-phenyl, (halogeno)-phenyl, (trifluoromethyl)-phenyl, (nitro)-phenyl, (di-lower alkylamino)-phenyl, pyridyl or (lower alkyl)-pyridyl, $Am_1$ is amino, mono- or di-lower alkylamino, lower alkyleneimino, monooxa-, monothia- or monoaza-lower alkyleneimino or N-lower alkyl- monoaza-lower alkyleneimino or N-(hydroxy-lower alkyl)-monoaza-lower alkyleneimino, wherein the heteroatoms are separated by at least 2 carbon atoms, $alk_3$ is 1,2-ethylene, 1,2- or 1,3-propylene and $n$ is an integer from 3 to 5, and therapeutically useful acid addition salts thereof.

Especially valuable are the compounds of Formula II wherein $R_1$ is phenyl, 2- or 4-methyl-phenyl, 2-or 4-methoxy-phenyl or 2- or 4-chloro-phenyl, $Am_1$ is amino, methylamino, dimethylamino, ethyleneimino, pyrrolidino, piperidino, morpholino, 4-methyl-piperazino or 4-(2-hydroxyethyl)-piperazino, $alk_3$ is 1,2-ethylene, 1,2- or 1,3-propylene and $n$ is one of the integers 3, 5 or preferably 4, and therapeutically useful acid addition salts thereof, especially the 1-phenyl-3-(2-mono- or dimethylaminoethoxy)-4,5,6,7-tetrahydroindazoles or said salts, which show antidepressant activity, for example, at about 10 mg. i.p. doses in the rats' amphetamine potentiation test.

The compounds of the invention are prepared according to methods in themselves known. Advantageously they are obtained by reacting compounds of the formulae

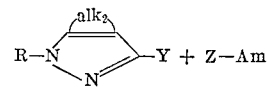

wherein (a) Y is reactively salified hydroxy or mercapto and Z is reactively esterified HO—$alk_4$— wherein $alk_4$ is lower alkylene or alkanoylene, or (b) Y is reactively converted —X—$alk_4$—OH and Z is hydrogen or one metal equivalent, and reducing any resulting alkanoyl compound to the corresponding alkyl compound and, if desired, converting any compound obtained into another compound of the invention.

Of the starting material used in the above reactions, the metal compounds are advantageously derived from alkali or alkaline earth metals, e.g. sodium, potassium or magnesium, and the reactive esters or acid derivatives preferably from hydrohalic, sulfuric or sulfonic acids, e.g. hydrochloric, hydrobromic, hydroiodic or sulfuric acid, methane, ethane, benzene or p-toluene sulfonic acid. Resulting compounds, wherein $alk_4$ is lower alkanoylene having the carbonyl group attached to Am, are reduced, for example, with simple or complex light metal hydrides, advantageously boron hydrides or alkali metal aluminum hydrides, e.g. lithium aluminum hydride.

The compounds of the invention so obtained may be converted into each other according to known methods. For example, resulting compounds in which Am stands for a primary or secondary amino group, may be reacted with a reactive ester of a corresponding alcohol, e.g. alkanol or alkanediol, or may be acylated, for example, with a reactive functional derivative of a corresponding acid, such as a halide or anhydride thereof, or resulting acyl derivatives may be hydrolyzed, for example, with the use of acidic or alkaline hydrolyzing agents. Resulting esters may be hydrolyzed or transesterified or resulting alcohols esterified. Resulting tertiary amines may be quaternized in the usual manner, for example with the use of reactive esters of alcohols, preferably of lower alkanols, but also of aralkanols.

The compounds of the invention are obtained in the free form or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric, or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophane, lysine and arginine.

These or other salts of the invention, for example, the picrates, can also be used for purification of the bases obtained; these bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines or alcohols mentioned above may be used in the form of their alkali metal, e.g. sodium or potassium salts. Mainly, those starting materials should be used in the process of the invention that lead to the formation of those compounds indicated above as being specially valuable.

The starting material used is known or, if new, may be prepared according to known methods. For example, that used in reaction (a) can be obtained by reacting a 2-halocycloalk-1-enecarboxylic or -thiocarboxylic acid halide [Ber. 93, 2746 (1960)] with an arylhydrazine or ar-alkylidenehydrazone, reducing any hydrazone condensation product obtained, e.g. with catalytically activated hydrogen, and ring-closing the resulting 2-halo-cycloalk-1-enecarboxylic or -thiocarboxylic acid N'-R-hydrazide in a high-boiling liquid, advantageously quinoline, with or without naphthalin. The resulting 3-hydroxy or mercapto-cycloalkano[c]pyrazoles are then converted into the reactive alcoholates or mercaptides, for example, with the use of alkali or alkaline earth metals or their hydrides or alkanolates. The compounds used in reaction (b) can be obtained from the metal compounds mentioned under item (a) and lower alkylene halohydrins, haloalkanoic acid esters, amides or nitriles and reactively esterifying or functionally modifying any resulting 3-(hydroxy- or carboxyalkoxy or -alkylmercapto)-cycloalkano[c]pyrazoles, e.g. with thionyl, sulfuryl, phosphorus or sulfonyl halides and the like.

The compounds of the invention can be used, for example, for the manufacture of pharmaceutical compositions containing them in conjunction or admixture with inorganic or organic solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, and all parts wherever given are parts by weight.

EXAMPLE 1

To the solution of 3.0 g. 1-benzyl-3-hydroxy-4,5,6,7-tetrahydro-indazole in 40 ml. dimethylformamide, 0.65 g. 55% sodium hydride (washed twice with diethyl ether) in 10ml. dimethylformamide are added portionwise while stirring. After stirring for 1 hour at room temperature, 1.9 g. 2-dimethylamino-ethyl chloride in 38 ml. toluene are added, followed by 15 ml. dimethylformamide and the mixture is stirred overnight at 60–70°. It is poured onto ice water, extracted with diethyl ether, the extract dried and evaporaed in vacuo. The residue is taken up in ethanol-diethyl ether, the solution neutralized with ethanolic hydrochloric acid, the precipitate formed filtered off and recrystallized from ethanol-diethyl ether, to yield the 1-benzyl-3-(2-dimethyl-ethoxy)-4,5,6,7-tetrahydro - indazole hydrochloride of the formula

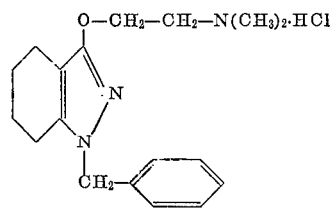

melting at 167–169°.

The starting material is prepared as follows: The mixture of 54.2 g. 2-chloro-cyclohex-1-enecarboxylic acid and 110 ml. thionyl chloride is stirred for 20 minutes at room temperature and refluxed for 30 minutes. It is evaporated in vacuo, the residue distilled and the fraction boiling at 60°/1 mm. Hg collected; it represents the corresponding acid chloride.

The solution of 22.6 g. thereof in 100 ml. methylene chloride is added dropwise to the mixture of 15.3 g. freshly distilled benzalhydrazone, 350 ml. methylene chloride and 18 ml. triethylamine while stirring, and stirring is continued for 1 hour at room temperature. The mixture is diluted with methylene chloride, extracted with saturated aqueous soidum bicarbonate, dried, evaporated in vacuo and the residue recrystallized from diethyl ether, to yield the 2-chloro-cyclohex-1-enecarboxylic acid N'-benzalhydrazide melting at 165–168°.

The solution of 10.65 g. thereof in 250 ml. ethanol is neutralized with ethanolic hydrochloric acid, and the mixture hydrogenated over 1 g. palladium charcoal at room temperature until one mol-equivalent of hydrogen has been absorbed. It is filtered, the filtrate evaporated in vacuo, the residue taken up in methylene chloride, the solution washed with saturated aqueous sodium bicarbonate, dried and evaporated. The residue is triturated with diethyl ether, the mixture filtered and the filtrate evaporated, to yield the 2-chloro-cyclohex-1-enecarboxylic acid N'-benzylhydrazide melting at 104°.

The mixture of 9.8 g. thereof and 65 ml. quinoline is refluxed for 2½ hours, cooled and diluted with diethyl ether. It is extracted with 2 N aqueous sodium hydroxide, the aqueous solution neutralized with 5 N hydrochloric acid and extracted with methylene chloride. The extract is dried, evaporated and the residue recrystallized from ethanol, to yield the 1-benzyl-3-hydroxy-4,5,6,7-tetrahydro-indazole, melting at 180–183°.

EXAMPLE 2

To the solution of 3.0 g. 1-benzyl-3-hydroxy-4,5,6,7-tetrahydro-indazole in 40 ml. dimethylformamide, 0.65 g. 55% sodium hydride (washed twice with diethyl ether) in 10 ml. dimethylformamide are added portionwise while stirring. After stirring for 1 hour at room temperature, 2.1 g. 3-dimethylamino-propyl chloride in 25 ml. toluene are added, followed by 15 ml. dimethylformadie and the mixture is stirred overnight at 60–70°. It is poured onto ice water, extracted with diethyl ether, the extract dried and evaporaed in vacuo. The residue is taken up in ethanol-diethyl ether, the solution neutralized with ethanolic hydrochloric acid, the precipitate formed filtered off and recrystallized from ethanol-diethyl ether, to yield the 1-benzyl-3-(3-dimethylamino-propoxy)-4,5,6,7 - tetrahydroindazole hydrochloride of the formula

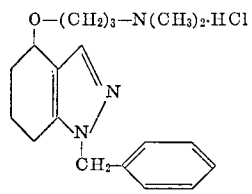

melting at 143°.

EXAMPLE 3

To the solution of 3.85 g. 1-phenyl-3-hydroxy-4,5,6,7-tetrahydro-indazole in 45 ml. dimethylformamide, 0.86 g. 55% sodium hydride (washed twice with diethyl ether) are added portionwise while stirring under nitrogen. After 1 hour, the solution of 2.5 g. 2-dimethylamino-ethyl chloride in 50 ml. toluene is added, followed by 25 ml. dimethylformamide and the mixture stirred overnight at 60–70°. It is poured onto ice water, extracted with about 500 ml. diethyl ether, the extract dried and evaporated in vacuo. The residue is taken up in ethanol-diethyl ether, the solution neutralized with ethanolic hydrochloric acid, the precipitate formed filtered off and recrystallized from ethanol-diethyl ether, to yield the 1-phenyl-3-(2-dimethyl-amino-ethoxy)-4,5,6,7 - tetrahydroindazole hydrochloride of the formula

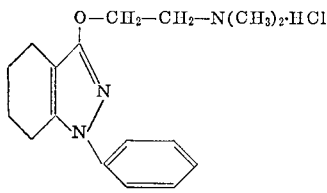

melting at 159–161°.

The starting material is prepared as follows: The solution of 3.1 g. 2-chloro-cyclohex-1-enecarboxylic acid chloride in 25 ml. methylene chloride is added dropwise to the mixture of 1.95 g. phenylhydrazine, 5 ml. triethylamine and 40 ml. methylene chloride while stirring, and the mixture is stirred overnight at room temperature. It is diluted with methylene chloride, washed with saturated aqueous sodium bicarbonate, dried, evaporated and the residue recrystallized from ethanol, to yield the 2-chlorocyclohex-1-enecarboxylic acid N'-phenylhydrazide, melting at 142–144° (B.P. 170°/0.1 mm. Hg).

The mixture of 2.51 g. thereof, 2.4 ml. quinoline and 25 g. naphthalene is refluxed for 24 hours. After cooling, it is diluted with diethyl ether, the mixture washed with water and extracted twice with 25 ml. 2 N aqueous sodium hydroxide. The aqueous phase is washed with diethyl ether, neutralized with 5 N hydrochloric acid and the precipitate formed filtered off. The filtrate is extracted with methylene chloride, the exract dried and evaporaed. The filter and evaporation residue are combined and recrystallized from ethanol-methylene chloride, to yield the 1-phenyl-3-hydroxy-4,5,6,7-tetrahydro-indazole melting at 209°.

Example 4

To the solution of 3.85 g. 1-phenyl-3-hydroxy-4,5,6,7-tetrahydro-indazole in 60 ml. dimethylformamide, 0.86 g. 55% sodium hydride (washed twice with diethyl ether) are added portionwise, and the mixture stirred for 1 hour under nitrogen. Hereupon the solution of 2.8 g. 2-dimethylamino-propyl chloride in 34 ml. toluene is added dropwise and the mixture stirred overnight at 60–70°. It is poured onto ice water, extracted with diethyl ether, the extract dried and evaporated in vacuo. The residue is taken up in ethanoldiethyl ether, the solution neutralized with a solution of maleic acid in acetone, the precipitate formed filtered off and recrystallized from actone-diethyl ether, to yield the 1-phenyl-3-(2-dimethylamino-propoxy)-4,5,6,7-tetrahydro-indazole maleate of the formula

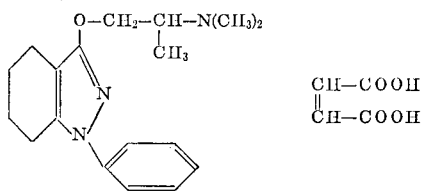

melting at 95° with decomposition.

Example 5

To the solution of 3.85 g. 1-phenyl-3-hydroxy-4,5,6,7-tetrahydro-indazole in 60 ml. dimethylformamide, 0.86 g. 55% sodium hydride (washed twice with diethyl ether) are added while stirring under nitrogen. After 1 hour, 2.8 g. 3-dimethylamino-propyl chloride in 35 ml. toluene are added, and the mixture stirred overnight at 60–70°. It is poured onto ice water, extracted with diethyl ether, the extract dried and evaporated. The residue is taken up in ethanol-diethyl ether, the solution neutralized with ethanolic hydrochloric acid, the precipitate formed filtered off and recrystallized from ethanol-diethyl ether, to yield the 1-phenyl-3-(3-dimethylamino-propoxy)-4,5,6,7 - tetrahydro-indazole hydrochloride of the formula

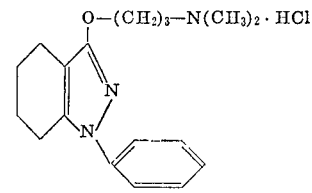

melting at 157–159°.

Example 6

According to the method described in Examples 3 to 5, the compounds of the Formula II are prepared, in which $R_1$ is phenyl, 2- or 4-methyl-phenyl, 2- or 4-methoxy-phenyl or 2- or 4-chloro-phenyl, $Am_1$ is amino, methylamino, dimethylamino, ethyleneimino, pyrrolidino, piperidino, morpholino, 4-methyl-piperazino or 4-(2-hydroxyethyl)-piperazino, $alk_3$ is 1,2-ethylene, 1,2- or 1,3-propylene and $n$ is one of the integers 3,5 or preferably 4, or therapeutically useful acid addition salts thereof, by selecting equivalent amounts of the corresponding starting materials.

From this group of compounds, the following members are especially valuable: 1-(phenyl or 4-chlorophenyl)-3-(2-dimethylaminoethoxy or 3 - dimethylaminopropoxy)-cyclopentano[c]pyrazole, 1-(phenyl or 4-chlorophenyl)-3-(2-dimethylaminoethoxy or 3-dimethylaminopropoxy)-cycloheptano[c]pyrazole, 1-(4-methyl-, 2-methoxy- or 4-chloro-phenyl)-3-(2-dimethylaminoethoxy or 3-dimethyl-aminopropoxy)-4,5,6,7 - tetrahydro - indazole or the 1-phenyl-3-[2-(amino-, methylamino-, ethylenimino-, pyrrolidino-, piperidino-, 4 - methylpiperazino- or 4- β- hydroxyethyl-piperazino)-ethoxy]-4,5,6,7-tetrahydroindazole, and the hydrochlorides or maleates thereof, as well as, for example, the 1-phenyl-3-(2-dimethylaminoethylmercapto)-4,5,6,7-tetrahydroindazole and the hydrochloride thereof.

Example 7

To the solution of 2.6 g. 1-phenyl-3-hydroxy-cyclopentano[c]pyrazole in 25 ml. dimethyl-formamide, the suspension of 0.625 g. 55% sodium hydride in 10 ml. toluene (the original mineral oil has been washed out 2 times with diethyl ether) is added portionwise while stirring at room temperature. After 1 hour the solution of 1.67 g. 2-dimethylamino-ethyl chloride in 21 ml. toluene is added dropwise and the mixture stirred for 24 hours at 70–80°. After cooling, it is diluted with water, extracted with diethyl ether, the extract dried and evaporated. The residue is distilled and the fraction boiling at 180–185°/ 0.1 mm. Hg collected, to yield the 1-phenyl-3-(2-dimethylaminoethoxy)-cyclopentano[c]pyrazole of the formula

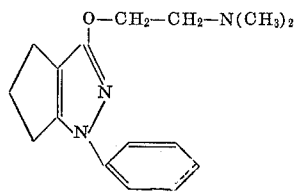

It is taken up in the minimum amount of ethanol and the solution neutralized with ethereal hydrogen chloride, to yield the corresponding hydrochloride melting at 207–208°.

The starting material is prepared as follows: The mixture of 10 g. 2-chloro-cyclopent-1-ene-carboxylic acid and 30 ml. thionyl chloride is refluxed for 2 hours, evaporated in vacuo, the residue distilled and the fraction boiling at 110–115°/15 mm. Hg collected, to yield the corresponding acid chloride.

The solution of 10.5 g. thereof in 10 ml. methylene chloride is added dropwise to the solution of 13.3 ml. phenylhydrazine in 300 ml. methylene chloride and 300 ml. diethyl ether while stirring at room temperature. After 2 hours the mixture is filtered, the precipitate washed with methylene chloride, the filtrate evaporated and the residue recrystallized from diethyl ether-hexane, to yield the 2-chlorocyclopent-1-ene-carboxylic acid N'-phenyl hydrazide melting at 109–111°.

The mixture of 10.3 g. thereof, 10.9 g. sodium bicarbonate and 109 ml. diphenyl ether is refluxed for 30 minutes under nitrogen. After cooling, it is diluted with diethyl ether and extracted 2 times with 2 N aqueous sodium hydroxide. The extract is washed with diethyl ether, adjusted with 5 N hydrochloric acid to pH 6 and extracted with methylene chloride. The extract is dried, evaporated and the residue recrystallized from ethanol, to yield the 1-phenyl-3-hydroxy-cyclopentano[c]pyrazole melting at 261–263°.

Example 8

According to the method shown in Example 3, the 1-phenyl-3-(2-dimethylaminoethoxy)-cycloheptano[c] pyrazole hydrochloride of the formula

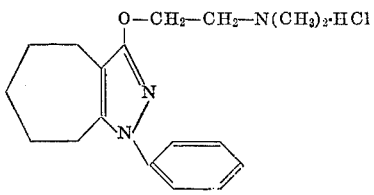

melting at 159–161°, is prepared from equivalent amounts of the corresponding starting material. The latter is prepared as follows:

The mixture of 30 g. 2-chloro-cyclohept-1-ene-carboxylic acid and 100 ml. thionyl chloride is refluxed for 2 hours, evaporated in vacuo, the residue distilled and the fraction boiling at 122–128°/15 mm. Hg collected, to yield the corresponding acid chloride.

The solution of 13.25 g. thereof in 100 ml. methylene chloride is added dropwise during 2 hours to the solution of 14 ml. phenyl hydrazine in 750 ml. methylene chloride and 750 ml. diethyl ether while stirring at room temperature. After 3 hours, the mixture is filtered, the precipitate washed with methylene chloride, and the filtrate evaporated, to yield the 2-chloro-cyclohept-1-ene-carboxylic acid N'-phenyl hydrazide.

The mixture of 14 g. thereof and 90 ml. quinoline is refluxed for 2½ hours under nitrogen. After cooling, it is diluted with diethyl ether and extracted 2 times with 2 N aqueous sodium hydroxide. The extract is washed with diethyl ether, filtered through infusorial earth, the filtrate adjusted with 5 N hydrochloric acid to pH 6 and extracted with methylene chloride. The extract is dried, evaporated and the residue recrystallized from ethanol, to yield the 1-phenyl-3-hydroxy-cycloheptano[c]pyrazole melting at 223–224°.

EXAMPLE 9

The solution of 4.2 g. 1-phenyl-3-(N-methylcarbamoylmethoxy)-4,5,6,7-tetrahydro-indazole in 100 ml. tetrahydrofuran is added dropwise to 35 ml. 1 molar borane in tetrahydrofuran while stirring at 0°. Hereupon the mixture is refluxed for 3 hours, cooled in an ice bath and 25 ml. 5 N hydrochloric acid are carefully added. It is concentrated under normal pressure, the concentrate made basic with aqueous sodium carbonate and extracted with methylene chloride. The extract is dried, evaporated, the residue taken up in ethanol and the solution neutralized with ethereal hydrogen chloride, to yield the 1-phenyl 3 - (2-methylaminoethoxy)-4,5,6,7-tetrahydroindazole hydrochloride of the formula

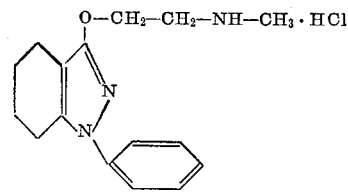

melting at 197–199°.

The starting material is prepared as follows: To the solution of 3.5 g. 1-phenyl-3-hydroxy-4,5,6,7-tetrahydroindazole in 35 ml. dimethylformamide, the suspension of 0.81 g. 55% sodium hydride (washed twice with diethyl ether) in 15 ml. dimethylformamide is added portionwise while stirring at room temperature. After 1 hour, the solution of 2.1 g. N-methyl-chloroacetamide in 20 ml. dimethylformamide is added and the mixture stirred for 20 hours at 70–80°. After cooling in an ice bath, the mixture is diluted with cold water and extracted with methylene chloride. The extract is dried and evaporated in vacuo, to yield the 1-phenyl-3-(N-methyl-carbamoylmethoxy)-4,5,6,7,-tetrahydroindazole.

In the analogous manner described in this example, the following compounds of Formula II are prepared from equivalent amounts of the corresponding starting material: $n=4$, $R_1=$phenyl, $alk_3=$1,2-ethylene.

| $Am_1$ | Salt | M.P., degrees |
|---|---|---|
| Amino | HCl | 199–201 |
| Pyrrolidino | HCl | 164–166 |
| Piperidino | HCl | 174–176 |
| $(CH_2)_6N-$ | HCl | 134–136 |

The 1-phenyl-3-carbamoylmethoxy-4,5,6,7-tetrahydroindazole melts at 183°.

EXAMPLE 10

According to the method described in Examples 1–5 and 7, the following compounds of Formula II are prepared from equivalent amounts of the corresponding starting material: $n=4$, $alk_3 = 1,2$-ethylene, $$Am_1 = N(CH_3)_2$$

| R₁ | Salt | M.P., degrees |
|---|---|---|
| 4-methylphenyl | HCl | 170–172 |
| 4-methoxyphenyl | HCl | 168–170 |
| 4-chlorophenyl | HCl | 188–190 |

EXAMPLE 11

Preparation of 10,000 tablets each containing 100.0 mg. of the active ingredient:

Formula

| | G. |
|---|---|
| 1 - phenyl-3-(2-dimethylamino-ethoxy)-4,5,6,7-tetrahydro-indazole | 1,000.00 |
| Lactose | 2,535.00 |
| Corn starch | 125.00 |
| Polyethylene glycol 6,000 | 150.00 |
| Talcum powder | 150.00 |
| Magnesium stearate | 40.00 |
| Purified water, q.s. | |

Procedure.—All the powders are passed through a screen with openings of 0.6 mm. Then the drug substance, lactose, talcum, magnesium stearate and half of the starch are mixed in a suitable mixer. The other half of the starch is suspended in 65 ml. water and the suspension added to the boiling solution of the polyethylene glycol in 260 ml. water. The paste formed is added to the powders which are granulated, if necessary, with an additional amount of water. The granulate is dried overnight at 35°, broken on a screen with 1.2 mm. openings and compressed into tablets using concave punches with 10.3 mm. diameter, uppers bisected.

We claim:
1. A basic 3-ether of a cycloalkano[c]pyrazole having the formula

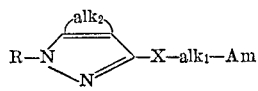

in which R is phenyl, (lower alkyl)-phenyl, (lower alkoxy)-phenyl, (lower alkylmercapto)-phenyl, (halogeno)-phenyl, (trifluoromethyl)-phenyl, (nitro)-phenyl or (di-lower alkylamino)-phenyl, Am is amino, lower alkylamino, di-lower alkylamino, hydroxy-lower alkylamino, N-(hydroxy-lower alkyl)-N-lower alkylamino, di-(hydroxy-lower alkyl)-amino, ethyleneimino, pyrrolidino, piperidino, morpholino, 4-methyl-piperazino or 4-(2-hydroxyethyl)-piperazino, X is oxygen, alk₁ is lower alkylene separating X from Am by at least 2 carbon atoms and alk₂ is lower alkylene forming a 5 to 7 membered ring, or therapeutically useful acid addition salts thereof.

2. A compound as claimed in claim 1 and having the formula

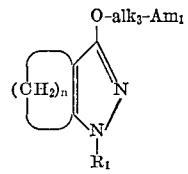

wherein R₁ is phenyl, (lower alkyl)-phenyl, (lower alkoxy)-phenyl, (lower alkylmercapto)-phenyl, (halogeno)-phenyl, (trifluoromethyl)-phenyl, (nitro)-phenyl or (di-lower alkylamino)-phenyl, Am₁ is amino, mono- or di-lower alkylamino, ethyleneimino, pyrrolidino, piperidino, morpholino, 4-methyl-piperazino or 4-(2-hydroxyethyl)-piperazino, alk₃ is 1,2-ethylene, 1,2- or 1,3-propylene and n is an integer from 3 to 5, or therapeutically useful acid addition salts thereof.

3. A compound as claimed in claim 2, in which formula R₁ is phenyl, 2- or 4-methyl-phenyl, 2- or 4-methoxy-phenyl or 2- or 4-chloro-phenyl, Am₁ is amino, methylamino, dimethylamino, ethyleneimino, pyrrolidino, piperidino, morpholino, 4-methylpiperazino or 4-(2-hydroxyethyl)-piperazino, alk₃ is 1,2-ethylene, 1,2- or 1,3-propylene and n is 4, or therapeutically useful acid addition salts thereof.

4. A compound as claimed in claim 2 and being the 1-phenyl-3-(2-dimethylamino-ethoxy) - 4,5,6,7 - tetrahydro-indazole or a therapeutically useful acid addition salt thereof.

5. A compound as claimed in claim 2 and being the 1-phenyl-3-(2-methylamino-ethoxy)-4,5,6,7 - tetrahydro-indazole or a therapeutically useful acid addition salt thereof.

6. A compound as claimed in claim 2 and being the 1 - phenyl - 3 - (2-aminoethoxy)-4,5,6,7-tetrahydro-indazole or a therapeutically useful acid addition salt thereof.

7. A compound as claimed in claim 2 and being the 1 - (4 - chlorophenyl) - 3 - (2-dimethylamino-ethoxy)-4,5,6,7-tetrahydroindazole or a therapeutically useful acid addition salt thereof.

References Cited

UNITED STATES PATENTS

| | | | |
|---|---|---|---|
| 3,364,227 | 1/1968 | Robinson | 260—310 R |
| 3,493,649 | 2/1970 | Massaroli | 260—310 R |
| 3,520,901 | 7/1970 | Massaroli | 260—310 R |

FOREIGN PATENTS

| | | | |
|---|---|---|---|
| 1,054,833 | 1/1967 | Great Britain | 260—310 B |
| 1,088,973 | 10/1967 | Great Britain | 260—310 B |

NATALIE TROUVOF, Primary Examiner

U.S. Cl. X.R.

260—240 J, 243 B, 247.1, 247.5 B, 268 BC, 293.4 C, 294.7 B, 294.8 C, 296 B, 310 R; 424—246, 248, 263, 267, 273